[19] United States Patent
Sekmakas et al.

[11] 4,257,933
[45] Mar. 24, 1981

[54] COPOLYMERS SOLUBLE IN WATER IN SALT FORM AND LATEX PAINTS CONTAINING THE SAME

[75] Inventors: Kazys Sekmakas, Palatine; Raj Shah, Schaumburg, both of Ill.

[73] Assignee: DeSoto, Inc., Des Plaines, Ill.

[21] Appl. No.: 111,018

[22] Filed: Jan. 10, 1980

[51] Int. Cl.$^3$ .......................... C08L 35/06; C07D 3/76
[52] U.S. Cl. .............................. 260/23 S; 260/23 ST
[58] Field of Search ........................... 260/23 S, 23 ST

[56] References Cited
U.S. PATENT DOCUMENTS

| | | | |
|---|---|---|---|
| 3,558,536 | 1/1971 | Sekmakas | 260/23 S |
| 4,143,012 | 3/1979 | Verma | 260/23 S |

Primary Examiner—Stanford M. Levin
Attorney, Agent, or Firm—Dressler, Goldsmith, Shore, Sutker & Milnamow, Ltd.

[57] ABSTRACT

A solution copolymer of styrene or vinyl toluene and allyl or methallyl alcohol is esterified with from 20% to 65% of the weight of the ester with ethylenically unsaturated monocarboxylic fatty acid containing from 8 to 22 carbon atoms. This ester is then copolymerized with monoethylenically unsaturated monomers including from about 2% to about 15%, based on the total weight of the final copolymer, of a monoethylenically unsaturated carboxylic acid to provide a copolymer which dissolves in water with the aid of a volatile base and which is particularly useful in pigmented latex paints.

4 Claims, No Drawings

COPOLYMERS SOLUBLE IN WATER IN SALT FORM AND LATEX PAINTS CONTAINING THE SAME

DESCRIPTION

Technical Field

The present invention relates to copolymers which dissolve in water with ammonium hydroxide or an amine and which are useful in latex paints to improve chalk penetration, adhesion, flow and leveling.

Background Art

Existing latex paints are constituted by aqueous emulsion copolymers which are pigmented, as by incorporation of titanium dioxide and appropriate extender pigments. These paints have various inadequacies which are minimized in commerce by the incorporation of various auxiliary resinous materials, usually of an oily nature, such as emulsified linseed oil or tung oil. These oils have also been modified by reaction with hydroxy polymers, such as styrene-allyl alcohol copolymer or epoxy resins, to form a more durable coating. Unfortunately, these oily products tend to separate from the latex and are difficult to remove from the brush or roller during clean-up using soap and water. The advantage of easy clean-up is an important feature of latex paint application and this difficulty makes the paint less satisfactory to the user. Also, the emulsified oily material tends to separate on storage which leads to all sorts of difficulties including pigment flocculation, coagulation and color changes which are obviously detrimental.

The prior art is further illustrated by Sekmakas U.S. Pat. No. 3,558,536 in which the styrene-allyl alcohol copolymer is esterified with unsaturated fatty acid which is then adducted with a monoethylenically unsaturated monocarboxylic acid having terminal unsaturation. An effort was made in that patent to minimize the excessively oily character of the product by using excess carboxylic acid for adduction and then reacting the excess with a monoepoxide, but further improvement is needed, and is provided by this invention.

DISCLOSURE OF INVENTION

In this invention, a copolymer of styrene and allyl alcohol containing about 3% to 15% by weight of the hydroxy group (preferably from 4% to 10%) is esterified with ethylenically unsaturated monocarboxylic fatty acid containing from 8-22 carbon atoms, preferably from 12-18 carbon atoms, to form an ester containing from 20% to 65% of unsaturated fatty acid, more preferably from 35% to 55% of unsaturated fatty acid, based on the weight of the copolymer ester. The unsaturation in the fatty acid must be ethylenic unsaturation, and various fatty acids such as linseed, soya, dehydrated caster, tung, tall oil, and safflower, are all useful.

The styrene-allyl alcohol copolymer is of relatively low molecular weight as is provided by copolymerization in organic solvent solution medium. The product sold as solid flakes by Monsanto under the trade designation of RJ 100 or RJ 101 are each fully useful herein. The styrene component may be replaced by vinyl toluene and the allyl alcohol component may be replaced by methallyl alcohol.

The copolymer ester is not itself dispersible in water, and it is copolymerized in this invention with monoethylenically unsaturated monomers including from about 2% to about 15%, based on the total weight of the copolymer, of a monoethylenically unsaturated carboxylic acid, such as acrylic acid, methacrylic acid, crotonic acid, itaconic acid, fumaric acid, and the like.

The unsaturated acid will constitute from 5% to 50% of the total monomers which are used, preferably from 10% to 30% thereof. All proportions herein are by weight unless otherwise stated.

The monomers other than the acid monomer are "nonreactive". This means that, aside from their polymerizable unsaturation, they do not react under the conditions of polymerization and use which are contemplated. A similar statement is that there are no functional groups except the polymerizable ethylenic group. Styrene and vinyl toluene are illustrative, though methyl methacrylate, methyl acrylate, ethyl acrylate, and vinyl acetate are also useful.

The esterification reaction is itself conventional and it will be illustrated in the examples. Similarly, the copolymerization is conventional being carried out in organic solvent solution using a free radical generating polymerization catalyst. These are well known and are illustrated in the Examples. The only caution is to employ a water miscible organic solvent, such as 2-ethoxy ethanol. The class of water miscible organic solvents is itself well known and it is also conventional to employ such solvents in the preparation of water dispersible copolymers.

The carboxyl functionality in the copolymer is at least partially neutralized in order to render the final copolymer soluble in water, neutralization being with a volatile base, such as ammonia or other amine like dimethyl ethanol amine. Volatile amines for salt formation to provide water solubility for carboxylfunctional copolymers is itself well known.

The latex paints which are modified in accordance with this invention are themselves well known, being produced by the copolymerization of vinyl monomers in aqueous emulsion. Nonionic surfactants are normally used to provide the desired emulsion for copolymerization and to stabilize the resulting latex. Redox copolymerization is frequently used, but this is not essential. These latex paints are usually pigmented, and the usual pigment is titanium dioxide. A typical latex and its pigmentation is described in Example 4 of said U.S. Pat. No. 3,558,536 and the class of latex paints to which this invention is applicable is more fully described in that patent which is incorporated herein by reference.

In order to provide the desired pigmentation, the pigment can be dispersed either into the latex in conventional fashion, or it can be dispersed in the water soluble copolymer produced by this invention, desirably after salt formation with the volatile base.

BEST MODE OF CARRYING OUT THE INVENTION 1005 grams of styrene-allyl alcohol copolymer containing 6% by weight of the hydroxy group (Monsanto product RJ 100 may be used) and 890 grams of tall oil fatty acid are added to a reactor equipped with an agitator and a reflux condenser and 40 grams of xylol are added for reflux. The trap is set with xylol and the reactor contents are heated to 255° C. and the mixture is allowed to react until the acid value decreases to 14–15. The resulting ester is cooled to 160° C. and 600 grams of 2-butoxy ethanol is added to provide a solution.

A premix is then formed of 450 grams of styrene, 120 grams of acrylic acid, 40 grams of cumene hydroperoxide, and 15 grams of di-tertiary butyl peroxide. This mixture is then added to the ester solution over a 2½ hour period at 125°–130° C. Copolymerization is then completed by adding 15 grams of cumene hydroperoxide and holding for 1 hour and then adding 6 grams of tertiary butyl perbenzoate and holding for 1½ hour, all at 125° C. The copolymer product is then cooled to 70° C. and 150 grams of dimethyl ethanol amine are added to neutralize the acidity in the copolymer, and the product is cooled to room temperature.

The product is a solvent solution of copolymer which dissolves in water because of salt formation.

The solution product has the following characteristics:

| | |
|---|---|
| Solids Content | 73.5% |
| Viscosity (Gardner-Holdt) | $Z_6$–$Z_7$ |
| Color | 4 |
| Acid value | 43.1 |

An acrylic copolymer latex is prepared as taught in Example 4 of U.S. Pat. No. 3,558,536 by aqueous emulsion polymerization to contain 66% ethyl acrylate, 32% methyl methacrylate and 2% glycidyl methacrylate. Ammonium hydroxide was added to the emulsion to provide a pH of about 9.5. The emulsion has a solids content of about 45%.

100 grams of the solution copolymer product is dispersed in 70 grams of deionized water and then 4.8 parts of this dispersion is mixed with 100 parts of the above acrylic latex. The modified latex so-provided is pigmented using a pigment mixture of 26% zinc oxide, 26% titanium dioxide, and 48% calcium carbonate. The pigment is added to provide a pigment to binder weight ratio of 1.4:1.

The modified paint produced as above described has excellent properties, and the brush or roller can be washed and cleaned easy with soap and water. This paint is particularly adapted to exterior application, but interior paints are also contemplated.

The water soluble salt of the ester copolymer may be used in an amount of from 3% to 40% based on emulsion copolymer solids, preferably from 5% to 20%.

We claim:

1. A copolymer of an ester of a solution copolymer of styrene or vinyl toluene and allyl or methallyl alcohol containing about 3% to about 15% by weight of the hydroxy group the hydroxy groups of said copolymer being esterified with from 20% to 65% of the weight of the ester of ethylenically unsaturated monocarboxylic fatty acid containing from 8–22 carbon atoms, said ester being copolymerized with monoethylenically unsaturated monomers including from about 2% to about 15%, based on the total weight of the final copolymer, of a monoethylenically unsaturated carboxylic acid copolymerizable with said ester, said monoethylenically unsaturated monomers comprising nonreactive monomer and from 5% to 50% by weight of the total monomers of said carboxylic acid monomer.

2. A copolymer as recited in claim 1 in which said nonreactive monomer is selected from styrene and vinyl toluene.

3. A water soluble salt of a volatile base with the ester copolymer of claim 1.

4. A latex paint comprising a pigmented aqueous emulsion containing emulsion copolymerized copolymer particles, and from 3% to 40%, based on the weight of said emulsion copolymerized particles, of the water soluble salt of the ester copolymer defined in claim 3.

* * * * *